SERGEI M. FOMENKO
INVENTOR.

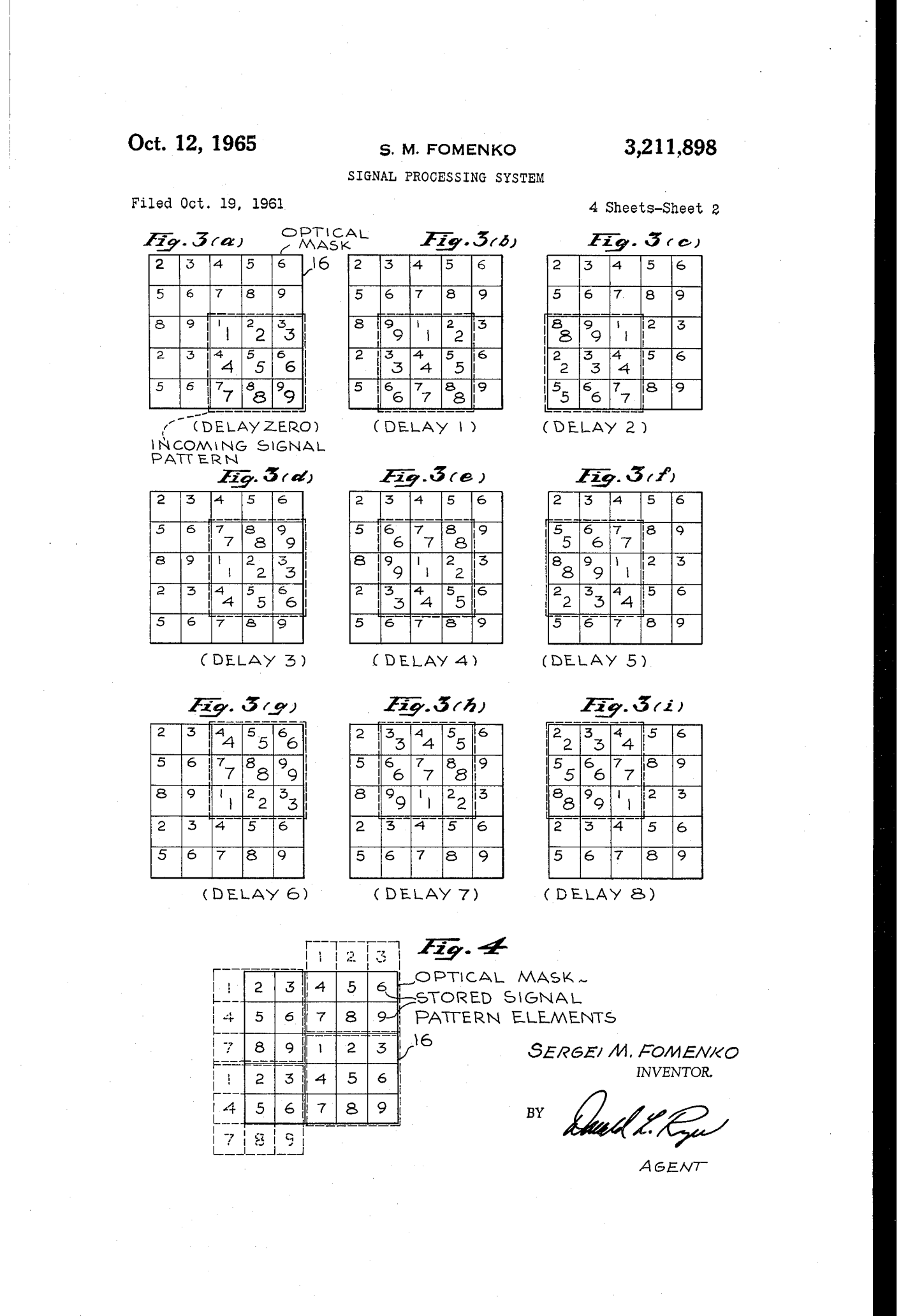

Oct. 12, 1965     S. M. FOMENKO     3,211,898

SIGNAL PROCESSING SYSTEM

Filed Oct. 19, 1961     4 Sheets-Sheet 2

SERGEI M. FOMENKO
INVENTOR.

BY

AGENT

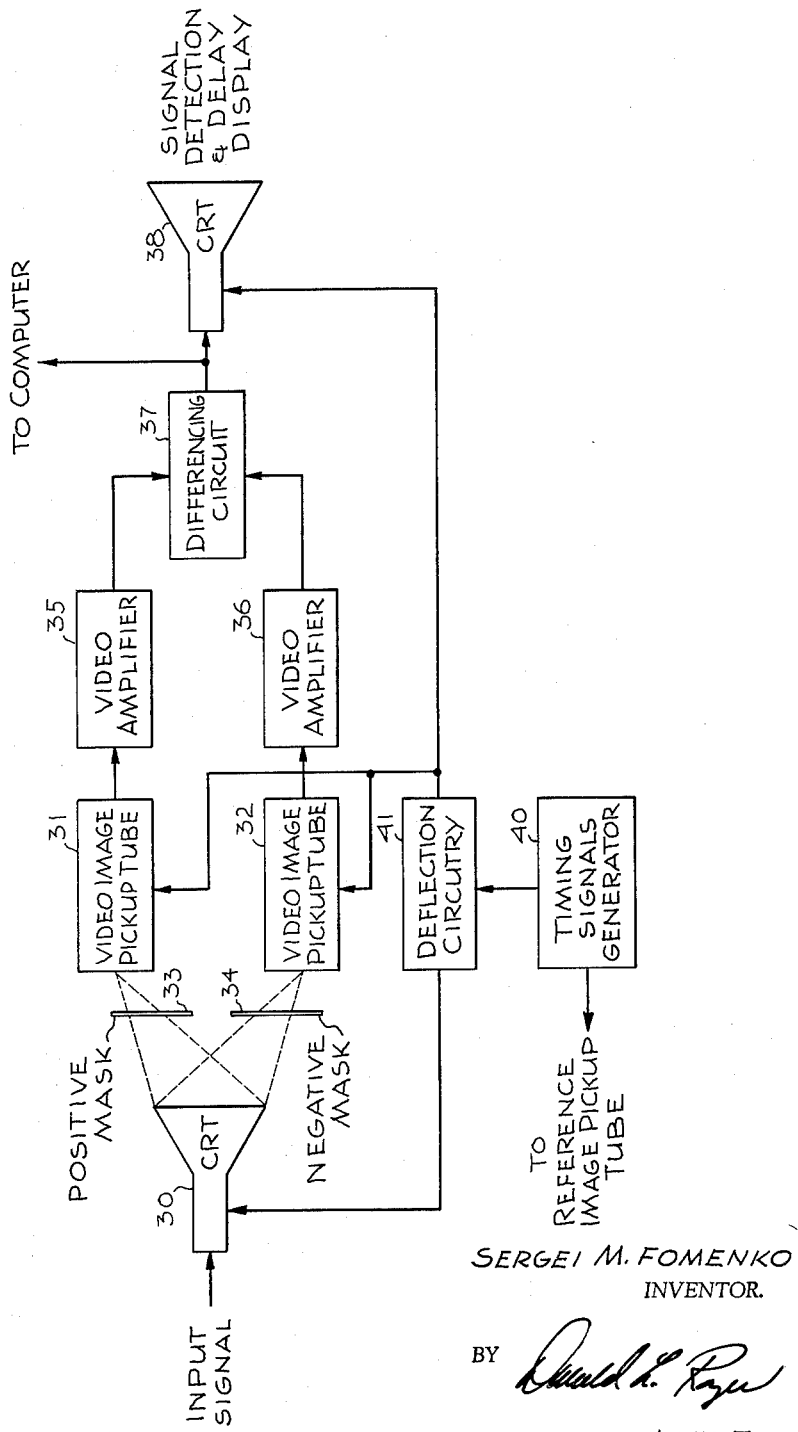

3,211,898
SIGNAL PROCESSING SYSTEM
Sergei M. Fomenko, Los Angeles, Calif., assignor to TRW Inc., a corporation of Ohio
Filed Oct. 19, 1961, Ser. No. 146,283
5 Claims. (Cl. 235—181)

This invention relates to systems for processing complex information. The invention finds particular utility in systems where high information content signals are to be examined for correlation and more specifically relates to electro-optical or more generally electrophotic devices for determining the time delay between representations of mutually coherent elements in a pair of electrical signals.

Many structures, including electronic apparatus, are contemporarily used for signal correlation to identify the occurrence and nature of predetermined characteristics in complex signals. For example, signals derived from a communication system, a ranging system or the like may have time varying components which are mutually coherent with respect to other signals of like derivation or with respect to reference signals. These time varying components may be partially obscured by random noise and may in themselves consist solely of preselected noise-like information of a given duration. Signal correlation systems have advantages resulting from the fact that mutually coherent components may be made to produce discernible output indications even though interfering noise components may be relatively strong.

The correlation between two time varying electrical signals thereof is represented by the integral, taken over a selected time interval, of the product of the two signals. A function, known as the correlation function, is defined by the variations in the correlation relationship between two signals which arise over a range of relative timing displacements between the two signals, and presents a maximum or peak correlation relationship when the mutually coherent components are in time coincidence.

While different types of correlators are known, all correlators used in signal detection systems generally derive correlation output signals which distinguish the point of maximum correlation on a relative timing displacement scale by virtue of a unique characteristic of an output signal.

While purely electrical or electronic correlators serve a useful purpose, it has been found that such correlators are somewhat impractical for use in instances where messages having large time-bandwidth products are encountered and particularly where the timing displacement between the mutually coherent components (or message components) of two signals is conditionally quite large. Electronic correlators normally employ a variable delay device for changing the relative timing displacement between two signals, together with a multiplier circuit to which the two signals are thereafter applied to develop a product signal. An integrating circuit is then provided for time averaging the product signal from the multiplier circuit over a selected interval to develop a correlation output signal. Such structures become excessively complex and impractical in instances where correlation is desired between two inputs having the possibility of a large common time-bandwidth product signal. Accordingly, it has been found that optical correlation techniques advantageously may be employed in such instances.

Through use of electrophotic or electro-optical correlation techniques, it has been possible optically to display time varying representations of a signal and thereafter to correlate such representations with optically defined representations of a predetermined signal or message representation. Such correlation techniques may be carried out through the use of electromagnetic radiation falling within or outside the visible light spectrum and hence may be more generally thought of as electrophotic correlation techniques. For convenience, therefore, the term optical will be used hereinafter as though it were interchangeable with the broader term photic. Conventional equipment for performing such optical correlation has, in general, consisted of a cathode-ray tube for displaying a strip like image representing an unknown message, a strip like transparency or mask defining a pattern of relatively opaque and transparent areas of varying area or varying density which represent a stored message, and a means such as a photocell for observing the correlation function resulting from optically superimposing the mask upon the cathode-ray tube image and moving the mask and image relative to one another. However, when using such equipment, problems arise when it is desired to correlate messages of relatively large time-bandwidth products and which are separated by an arbitrary time interval which may be quite substantial in value. For example, considering a message that is fifty seconds long and a bandwidth of four hundred cycles per second, the time-bandwidth product is twenty thousand. Using prior known systems and equipment, such a message, containing the twenty thousand bits or elements, would have to be displayed on a single line of a cathode-ray tube or like display device and is, from a practical standpoint, beyond contemporary definition and size capabilities of known optical display devices.

In another instance, it is often a desideratum optically to correlate messages with known characteristics thereof and to provide an indication of aspects of the message such as timing displacement thereof. In long time-bandwidth product messages, due to the problems of display or representations of such a message, it has been considered impractical to provide an accurate measurement of timing displacement between two representations of a message or signal nor has it been possible to obtain the high resolution necessary, particularly in the presence of high background noise or deliberate jamming signals which create additional or false signal representations.

In accordance with one aspect of the present invention, correlation between predetermined serially arranged characteristics of a long time-bandwidth product original message is obtained by first providing a serially arranged, variably illuminated display as by an area line raster scan on a cathode-ray tube representing the amplitude-versus-time characteristics of the message. Thereafter, means are provided for sensing and indicating the location of a point where rays emanating from the display converge after passing through a variable opacity mask, disposed intermediate the display and a device for sensing and indicating the location of the point. The mask carries an image pattern depicting the predetermined serially arranged characteristics of the message and having individual elements of the message redundantly repeated in a manner enabling correlation with the display regardless of any serial arrangement of the elements which may depart from the serial arrangement of characteristics of the original message due to time delays of substantial magnitudes. Any one complete arrangement of the message, as carried by the mask, is proportionally smaller than that depicted in the display. The occurrence of a particularly bright spot in the plane of the sensing device indicates the existence of correlation between the display and the stored pattern. The arrangement of elements on the mask is such that the location of the bright spot representing the peak of the correlation function, as depicted on the sensing device, may then be interpreted as indicating an aspect of the message such as its transmission time.

In accordance with another aspect of the invention, the peak of the correlation function is enhanced, in a manner to create a light spot that is proportionally brighter than background areas in the output, through use of a pair of transparencies, representing positive and negative characteristics of a signal, and a pair of devices, such as television cameras, for scanning the positive and negative representations of the message as displayed by a cathode-ray tube. The difference between the two television camera outputs may then be used to obtain a net correlation value and, assuming that the output characteristics of the two cameras correspond closely, noncorrelating signals will then produce a near zero output. It may thus be seen that the signal to noise ratio effectively may be enhanced.

The optical correlation system and apparatus hereof are particularly applicable for use with radar and sonar systems, in connection with secure communication and in other areas wherein it is desired to correlate signals having large time-bandwidth products.

It is therefore one important object of the invention to provide an optical correlation system and apparatus for correlating representations of messages or signals having a large time-bandwidth product.

Another object of the invention is to provide a system and apparatus to enable precise measurement of a time interval between two corresponding signals.

A further object of the invention is to provide an optical correlation system and apparatus including high resolution output means for displaying a measurmement of delay between two representations of a message.

Still another object of the invention is to provide means for continuous observation of a signal which may contain a desired messeage.

Another important object of the invention is to provide an optical correlator that is relatively simple in construction, reliable and effective in use and relatively inexpensive in manufacture.

A still further object of the invention is to provide an optical correlator wherein displayed representations of a signal may be correlated with known characteristics of the signal and wherein such characteristics may be of a quasi-random nature and rapidly altered as desired.

It is another object of the invention to provide an optical correlator including means for enhancing the peak of the correlation function.

Other and further important objects of the present invention will become apparent from the disclosures in the following detailed specification, appended claims and accompanying drawings, wherein:

Figure 5A:
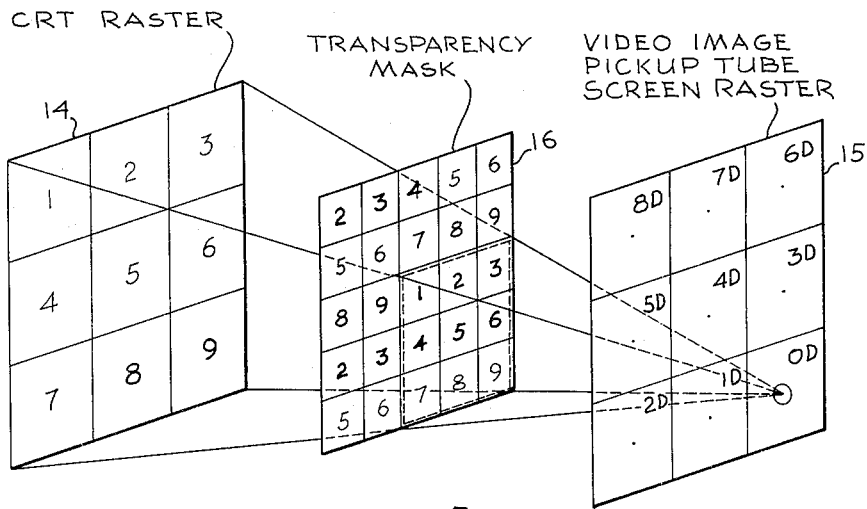
Figure 5B:
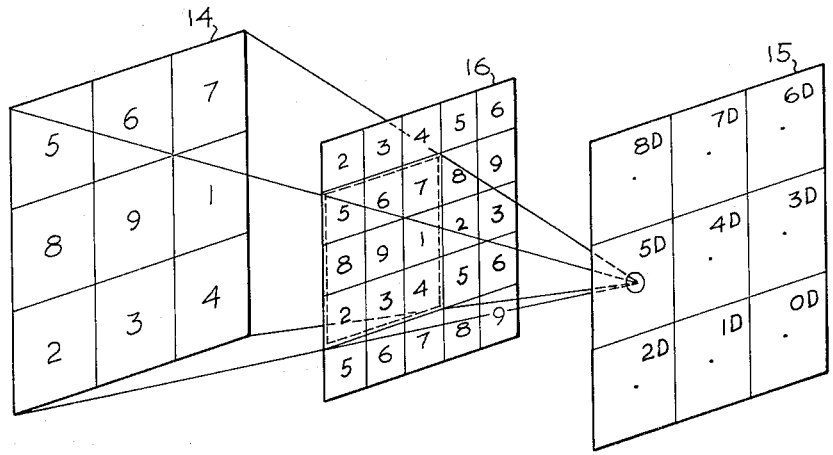

FIGS. 3(a) through 3(i) are diagrammatic illustrations representing various possible serial arrangements of a displayed message in one example of use of the present invention;

FIG. 4 is a diagrammatic illustration showing the manner of constructing a typical transparency for use as a portion of the present optical correlator;

FIGS. 5(a) and 5(b) are diagrammatic illustrations showing the manner by which a peak correlation function is obtained and displayed as an indication of timing displacement; and FIG. 6 is a block diagram illustrating a modified arrangement of the present optical correlation system.

Figure 1:
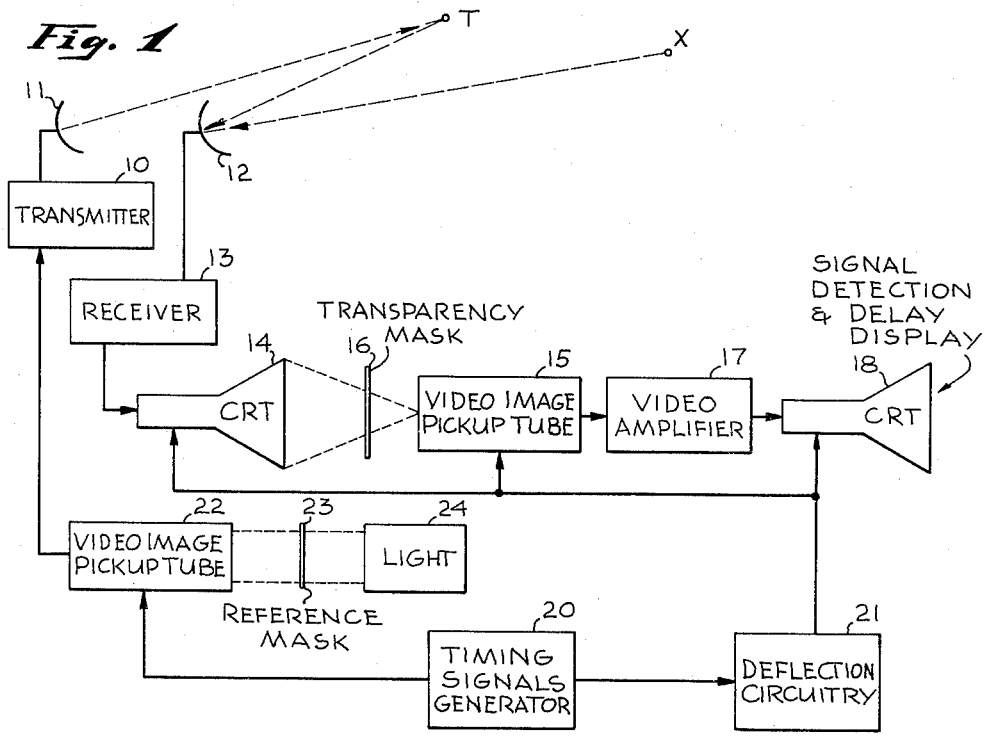
FIG. 1 is a block diagram illustrating a typical optical correlation system and appartus in acocrdance with the present invention.

With reference to the drawings and with reference primarily to the block diagram of FIG. 1, the present optical correlation system is shown in conjunction with one example of the use thereof, this being as a portion of a radar system. In this connection, it is to be understood that the illustrated radar application for the present optical correlator is but one of many systems in which such structures are useful as, for example, in sonar systems, in secure communications or in other instances where it is desired to correlate large time-bandwidth product or complex information with a stored version of such information.

As shown, the illustrated system includes a radar transmitter 10 having an antenna 11. Echo signals from a target T are adapted for reception by an antenna 12 of a radar receiver 13. Obviously, the antenna 12 will also receive spurious signals created by normal atmospheric noise and may also receive a deliberately transmitted jamming signal from the target T or from any remote location as indicated, for example, at X. The output of the receiver 13 is delivered to a display device such as display cathode-ray tube 14 on which representations of the information received by the receiver are displayed. The characteristics of these representations will be discussed in detail here inafter. As shown, a video image pickup or television camera tube 15 is disposed to scan the pattern existing on its face as the result of the projection of the image from the display cathode-ray tube 14 through a storage transparency 16. The detail characteristics of the storage transparency or mask 16 will also be discussed in detail hereinafter. The output of the pickup tube 15 is amplified in a video amplifier 17 and is thereafter delivered to a readout cathode-ray tube 18 where, for reasons as will hereinafter become apparent, a correlation function is displayed. The output of the amplifier 17 may also be directed to automatic detection and tracking device (not shown), as required. In order that there may be synchronous operation between the display cathode-ray tube 14, pickup tube 15 and readout cathode-ray tube 18, timing signal generator 20 is provided, one output therefrom being delivered to suitable deflection circuitry 21 for controlling operation of the cathode-ray tubes 14 and 18 and the tube 15. Another output from the timing signal generator 20 is fed to another video image pickup tube 22 the output of which is utilized to control modulation of the signal produced by the transmitter 10. The pickup tube 22 is adapted to scan a reference mask 23 that may be illuminated from a light source 24. The reference mask 23 is similar to mask 16 and will be discussed in detail hereinafter. It may thus be seen that the transmitter 10 has an output signal that is modulated in accordance with the output of the tube 22, with the received echo signal, as displayed on the cathode-ray tube 14, at least presenting a reproduction of characteristics of the transmitted message as determined by the stored message characteristics carried by the reference mask 23.

The optical correlator hereof achieves a large time-bandwidth product in the display by the cathode-ray tube 14 by virtue of an area storage system. Mechanical motion of the signal storage medium is obviated through use of ray optics that project the correlation function of an area in order that a desired correlation signal may be obtained by scanning the area. For this purpose, information contained in the signal received by the receiver 13 is displayed by the cathode-ray tube 14 and projected onto the photosensitive surface of the pickup tube 15. The necessary point by point storage to integrate over the period of the reference signal is readily provided in such a pickup tube. An output signal is derived by the normal scanning operation of the pickup tube 15.

When considering the problem of providing correlation of information contained in a delayed signal, as displayed on the cathode-ray tube 14, with information contained in representations of the signal stored in the transparency mask 16, storage signal parameters may include a signal duration of one millisecond, for example, and the bandwidth may be in the order of 10 megacycles per second. Accordingly, a practical time-bandwidth product would be 10,000 cycles and, while the present optical correlation is capable of handling such time-bandwidth products, it is to be understood that larger time-bandwidth products and unlimited repetition periods may be employed. A practical minimum time-bandwidth product is dependent upon anticipated noise characteristics of the received signal.

The raster of the cathode-ray tube 14, to handle the time-bandwidth product of 10,000 cycles, may then contain 100 lines with 100 resolvable elements per line scan at a frame rate of approximately 1,000 per second. Thus, a delayed representation of a signal may be displayed in its entirety and will always completely fill the frame of the cathode-ray tube 14 regardless of its delay. Since the exact time of arrival of such a delay signal is undefined, the beginning of the signal may appear anywhere within the cathode-ray tube raster and consequently the entire image of the signal will appear to be scrambled, thus presenting a problem relative to attempts to correlate this display signal with known characteristics thereof and with a simple stored image. In accordance with the present invention, this problem is solved through use of a unique configuration of the stored signal elements as carried by the transparency mask 16, this arrangement making correlation possible within limits regardless of time delay of the signal.

In order to amplify the description of the principles involved in arranging representations of the stored image on the transparency mask 16, the problem may be scaled down in time-bandwidth product from 10,000 to 9 elements, for example. The nine elements of the signal and the representations thereof may then be numbered sequently from 1 to 9 and the displayed signal may appear on a three by three element display in any one of nine possible configurations since the starting element 1 may appear in any position. These configurations are shown in FIGS. 3 (a) through 3 (i) inclusive as enclosed by the dotted lines and superposed upon the transparceny mask 16. As shown, the received pattern is repeated the nine times to correspond with the nine possible delayed signal patterns. It is to be understood that any practical number of possible delays within a pulse length may be processed and that such number will be equivalent to one less than the time-bandwidth product, inasmuch as the signal, as represented in FIG. 3 (a), represents a delay of zero time. The transparency mask 16 has the elements of the message arranged thereon in such a manner whereby, for any delayed signal configuration, there will always be a correlatable group of nine similar elements arranged in a square array within the confines of the transparency mask 16.

As shown primarily in FIG. 4, the transparency mask 16 is formed by a redundant repetition of the elements of the stored signal. From a practical standpoint, it may be seen that four duplicate representations of the signal are combined as indicated in FIG. 4 and thereafter edge portions of the representations are removed as indicated by the dotted lines to provide the desired configuration of the transparency mask 16. It may thus be seen that the total number of necessary elements in the transparency mask 16 will be equal to $(2\sqrt{M}-1)^2$ where M represents the time-bandwidth product and all possible iterations of M appear in the pattern on the mask. For a message where M is equal to 9, the total number of elements on the transparency mask 16 will be 25 and for very large values of M, the total number of elements on the transparency mask will be essentially 4M. In actual practice, the elements representing the characteristics of the stored signal on the transparency mask 16 may comprise a randomly determined, serially arranged series of transparent and opaque finite areas, or may alternatively be of variable opacity. Any one serial arrangement of the elements of the signal on the transparency mask 16 is also proportionally smaller than the anticipated display of these elements on the face of the cathode-ray tube 14.

As a further explanation of the manner by which the correlation function is obtained and the peak of the correlation function produced, in accordance with the present invention, a portion of the nine sequentially numbered elements in the present example, as displayed on the display cathode-ray tube 14, may be considered as individual illuminuated areas of finite size. The balance of the nine elements may be considered as dark or unlighted areas. Additionally, the correspondingly numbered areas in the transparency mask 16 may be considered as being transparent or opaque corresponding respectively to the illuminated or dark areas of the display cathode-ray tube 14. It may then be seen that light from each of the individual illuminated areas on the cathode-ray tube display will pass through each of the individual transparent areas in the transparency mask 16 to produce the correlation function. However, it may also be seen that, inasmuch as any one of the serial arrangements of the message stored in the transparency mask 16 is proportionally smaller than the display on the cathode-ray tube 14, the peak correlation function will be obtained through convergence of the light from the illuminated areas of the cathode-ray tube 14 through the corresponding transparent areas of the transparency mask 16. A light spot thus produced at the point of convergence of the light beams or rays from each of the illuminated finite areas of the display has an intensity corresponding to the sum of the energy of all of the illuminated areas of the display cathode-ray tube 14. The balance of the correlation function will have an intensity substantially less than that of the peak correlation function as defined by the light spot.

Figure 2:
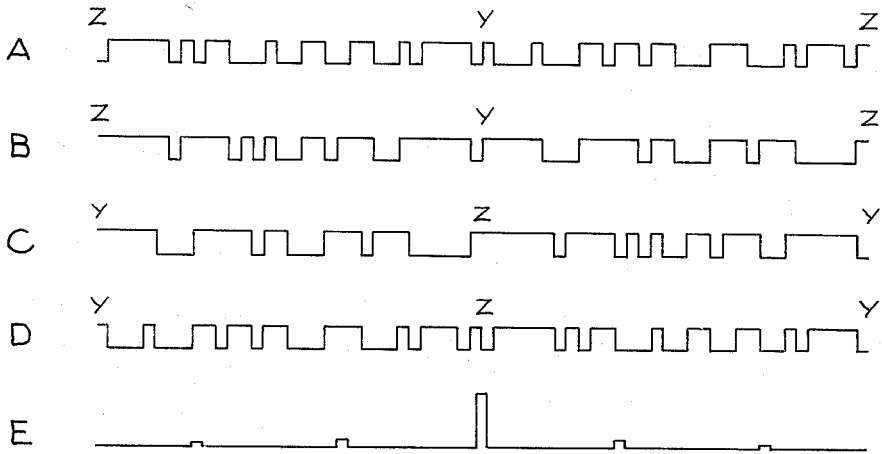
FIG. 2 is a series of graphs representing different signal characteristics as encountered in the optical correlation system of FIG. 1.

The reference mask 23 is aranged with representations of the elements of a signal in an order that is identical to that of the stored representations on the transparency mask 16. Accordingly, a typical signal as transmitted by the transmitter 10 may be modulated as indicated by line A in FIG. 2. However, as indicated in line B, while the received echo signal includes the characteristics of the transmitted signal, this received signal may also include spurious signals as created by background noise or deliberate jamming efforts. As indicated in line C, this composite signal including background noise may also be delayed whereby the start of the message is now serially adjacent the end of the message as indicated at point Z on line C. Line D represents the serial arrangement of a corresponding delayed signal as stored in the transparency mask 16. Line E will be discussed in detail hereinafter. While the various representations of a message as shown in FIG. 2 are illustrated as being on a single line, it is to be understood that while such a single line representation would be sufficient for small time-bandwidth product messages with low noise content, but large time-bandwidth product messages could not, from a practical standpoint, be displayed on such a single line except by the use of photographic techniques which would introduce intolerable delays. Accordingly, an area type display is utilized in the system of this invention.

With references to FIGS. 5a and 5b, the manner of obtaining the correlation functions are illustrated in which an undelayed signal and a signal delayed by 5 times units, for example, are displayed on the face of the display cathode-ray tube 14. It may be seen that a peak of the correlation function corresponding to a given delay will appear at a dedicated location on the screen of the pickup tube 15 and in a manner whereby the nine element array will provide for detection of all nine possible delays ranging from zero to eight time units. In FIGS. 5(a) and 5(b) the nine delays are numbered sequentially from 0D to 8D. In actual practice, wherein M equals 10,000, an array of 10,000 individual points on the screen of the pickup tube are interogated using a matrix arrangement of 100 by 100 points. The scan of the display cathode-ray tube 14 produces a luminous display of the input signal as, for example, from left to right, as viewed in FIGS. 5(a) and 5(b) starting with a top line, returning to the left end of a second line and so on to completion of the area scanned. For a signal delayed by $M/2$ time units, for example, the beginning of the serial arrangement of the elements will appear in a central area of the cathode-ray tube raster as indicated in FIG. 5(b). In this instance, the first half of the elements of the message will appear in the lower half of the display cathode-ray tube 14 and the remainder will appear in the upper half of the cathode-ray tube. In the present example, the correlation function is generated on the screen of the pickup tube 15 during the time interval during which the input signal is being displayed by the cathode-ray tube 15. It will be seen that the pickup tube 15 scans the screen thereof in a reverse direction from that of the display cathode-ray tube 15, as required by the present particular arrangement of the elements as stored on the transparency mask 16. Other than the opposite directions of scanning, the scans of the display cathode-ray tube 14 and pickup tube 15 are completely synchronous and the scanning beam always interogates the delay point representing the peak correlation function on the screen of the pickup tube immediately following completion of the display of the message elements for a particular time delay. Following amplification in the amplifier 17, the output signal from the pickup tube 15 passes to the readout cathode-ray tube 18 whereupon the signal, upon detection thereof, will be displayed as intensity modulation at a position corresponding to the displacement of the correlating signal. This relationship is represented by line E in FIG. 2. The location of the peak of the correlation function on the face of the readout cathode-ray tube 18 may then be interpreted as being a representation of a particular time delay value.

Determination of the location of the peak correlation function and determination of a delay time interval may be accomplished by any well known means. For long time-bandwidth product messages containing, for example, 10,000 or more elements, X and Y axis locations on the screen of the cathode-ray tube 18 may be determined through use of a suitable element counter and may be read out by any suitable means such as through a display of actual numbers interpreting the delay in terms of distance as may be required in radar or sonar systems. The correlation function may also be fed directly to a suitable automatic detection apparatus such as a computer. Additionally for delays in excess of the time-bandwidth product of the message under consideration may be determined through use of a suitable pulse length counter.

From a practical standpoint, it has been found that the display cathode-ray tube 14 may have a display area that is approximately 5 inches square. The transparency mask 16 may also be approximately 5 inches square; however, inasmuch as the redundant pattern carried by the transparency mask is repeated approximately four times, any one complete pattern is thus approximately one-half scale as compared to that displayed by the display cathode-ray tube 14. In this particular example, the video image pickup tube 15 may have a screen area that is approximately 3/8 inch square. The square format is used to best advantage and serves to maintain linearity of operation of the display and readout cathode-ray tubes. The longitudinal axial spacing between the elements of the present apparatus is dependent upon specific sizes of the individual structures as well as the proportional sizes of the display cathode-ray tube and a complete representation of the characteristics of the signal on the transparency mask.

In instances where a time delay exceeds the time-bandwidth product, it is apparent that the indication of delay on the readout cathode-ray tube 18 may be misinterpreted. In such instances, when it is anticipated that such a long time delay may exist, the representations of the signal may be displayed on a portion of the screen of the display cathode-ray tube 14, either in the described square format or in a substantially rectangular format. For example, in a signal having a time-bandwidth product of, say, 5,000, a cathode-ray tube having a capability of displaying a signal having a time-bandwidth product of 10,000 may be used. In such instances, a signal delay for a time in excess of the time-bandwidth product will appear near the end of the scan of the cathode-ray tube 14 and may thereafter be correlated suitably with stored representations of the signals as carried by the transparency mask 16. It is to be noted that the number of elements required to be represented on the transparency mask 16, is, in this instance, similar to the number of such elements required when the full screen of the display cathode-ray tube is utilized; however, the video image pickup tube must have a capability of scanning a 10,000 element display to provide an accurate time delay representation, as determined by the location of the peak of the correlation function. In still another instance, where anticipated time delays may exceed the ratio of the time-bandwidth product to the display capabilities of the display cathode-ray tube, a plurality of sequentially operable display cathode-ray tubes may be employed together with individual correlating apparatus including identical transparency masks and associated pickup tubes, or the like, thus to enable an accurate indication of delay time.

While the display cathode-ray tube 14 is described as one device for displaying information to be correlated with stored representations thereof, it is to be understood that other display apparatus may be employed for the same purpose. Apparatus suitable may include an illuminated screen having information projected thereon from an optical projector or may, in some instances and applications, be an illuminated sheet of material, photograph or transparency containing the representations of information to be correlated with information on the transparency mask. It is further to be understood that, in accordance with the present invention, it is not always necessary to employ luminous energy in the visible range for the display cathode-ray tube or other display means. In some instances, ultraviolet radiation, for example, may be employed, with the means for observing the correlation function being compatible with such radiation. In still other instances, devices other than a video image pickup or television camera tube may be employed for observing the correlation function. Such devices may comprise a photographic apparatus, for example, or simply sheets of photosensitive material disposed at the plane of convergence of the peak correlation function. The type of observation device is, of course, a desideratum in accordance with the overall system characteristics and the allowable readout time.

Inasmuch as the transparency mask 16 has the characteristics of the individual elements of the signal disposed thereon in a predetermined but otherwise random fashion, for a large time-bandwidth product message containing 10,000 elements, for example, the number of possible combinations of such elements is very large. It may therefore be seen that in a radar, sonar or secure communications system, for examples, the signals may be suitably coded. It will also be recognized that it is only necessary to substitute a new transparency mask 16 and a new reference mask 23 in order to change from one predetermined coded signal to another.

As shown primarily in FIG. 6, the present correlation system may incorporate additional apparatus to enable substantial enhancement of the peak of the correlation function. In this form of the invention, a display cathode-ray tube 30 or like display apparatus is used to display characteristics of an input signal. The image on the cathode-ray tube 30 is projected onto a pair of video image pickup tubes 31 and 32 through a pair of transparency masks indicated respectively at 33 and 34 and presenting respectively positive and negative redundant representations of the signal. The positive transparency mask 33 is similar to the previously described transparency mask 16, while the transparency mask 34 carries the negative representation of the signal components or elements. In other words, the transparency masks 33 and 34 are prepared in a manner whereby a zero reference signal is represented as, for example, an opaque area on mask 33 and a transparent area on mask 34. Thus, the corresponding positive and negative correlation values are synchronously scanned by the video image pickup tubes 31 and 32 respectively with their instantaneous difference corresponding to the enhanced correlation value. Following amplification in video amplifiers 35 and 36, the outputs of the pickup tubes 31 and 32 are fed to a difference circuit indicated at 37 with a difference value obtained between the outputs of the two pickup tubes being used to obtain a net correlation value which may thereafter be displayed by a suitable readout cathode-ray tube 38. Accordingly, assuming that the output characteristics of the two video image pickup tubes 31 and 32 correspond closely, noncorrelating signals will produce a near zero output rather than the relatively large output characteristic of a single pickup tube, due to correlation of the D.-C. components of the two signals. The peak correlation function is therefore represented and displayed by the cathode-ray tube 38 as a value substantially greater than the background created by the noncorrelating signal characteristics, with a high net positive output indicating the presence of a sought after signal. The particular location of the repersentation of the peak correlation function on the cathode-ray tube 38 is, as previously described, an indication of an aspect of the signal, such as its delay time. As shown in FIG. 6, the output of the differencing circuit may also be fed to a computer or the like for further processing. Also, a suitable timing signal generator 40 is provided, one output thereof being connected to deflection circuitry 41 that is in turn connected to the cathode-ray tube 30, pickup tubes 31 and 32 and cathode-ray tube 38 whereby to maintain synchronous operation of these system components. Another output of the generator 40 may be delivered to the reference image pickup tube, similar to that indicated at 22 in FIG. 1.

It is further to be understood that additional cathode-ary tubes such as that indicated at 30 may also be employed, each with a pair of transparency masks representing the positive and negative characteristics of the sought after signal. Each of the cathode-ray tubes may thus be scanned through each of the transparency masks. In a system utilizing two cathode-ray tubes and four video image pickup tubes, one cathode-ray tube is operated dark and the other light in the absence of a signal with one cathode-ray tube brightening on a positive signal, the other darkening on a negative signal. The output of the four video image pickup tubes may then be added algebraically to obtain a net correlation function signal. In such an instance, the positive-positive and negative-negative outputs of the pickup tubes associated with one cathode-ray tube will have positive signs, and the positive-negative and negative-positive outputs of the pickup tube associated with the other cathode ray tube will have negative signs. Accordingly, assuming equivalence of gain and a linear response in all of the components, the output, after algebraic addition, comprises the desired correlation function.

What is claimed is:

1. In an apparatus useful in correlating a signal with known characteristics thereof:
   signal receiver means for receiving a signal including a message having predetermined characteristics;
   cathode-ray tube display means coupled with said signal receiver means to produce a display of the characteristics of the signals received by said signal receiver means;
   energy responsive receiving means arranged for reception of energy from said cathode-ray tube display;
   energy masking means disposed intermediate said cathode-ray tube display means and said energy responsive receiving means;
   a pattern carried by said energy masking means, said pattern being proportionally smaller than said display and having variable opacity characteristics equivalent to characteristics of said message displayed by said cathode-ray tube display means, whereby to transmit and produce a concentration of said energy for reception by said energy responsive receiving means when said characteristics of said message are present in said display;
   additional visual display means connected to receive and display an output from said energy responsive receiving means;
   and timing control means for maintaining synchronous operation between said cathode-ray tube display means, said energy responsive receiving means and said additional visual display means.

2. In a correlation system:
   transmitting means for emitting a signal, said signal comprising a message having predetermined characteristics;
   signal receiver means;
   cathode-ray tube display means coupled with said signal receiver means to produce a display of the characteristics of signals received by said signal receiver means;
   energy responsive receiving means arranged for reception of energy from said cathode-ray tube display;
   energy masking means disposed intermediate said cathode-ray tube display means and said energy responsive receiving means;
   a pattern carried by said energy masking means, said pattern being proportionally smaller than said display and having variable opacity characteristics equivalent to characteristics of said message displayed by said cathode-ray tube display means, whereby to transmit and produce a concentration of said energy for reception by said energy responsive receiving means when said characteristics of said message are present in said display;
   additional visual display means connected to receive and display an output from said energy responsive receiving means;
   and timing control means for maintaining synchronous operation between said transmitting means, said cathode-ray tube display means, said energy responsive receiving means and said additional visual display means.

3. In an apparatus useful in correlating a signal with known characteristics thereof:
   means for receiving a signal including a message having M number of elements serially arranged in a predetermined order having a beginning element and an ending element;
   display means coupled with said receiving means to provide a display depicting individual characteristics of at least said elements of said message as received by said receiving means, said elements of said message being arranged in orders ranging from a direct correspondence to said predetermined order to any one of a plurality of $M-1$ orders where said elements are separated into two groups and serially arranged to dispose said ending element before and serially adjacent to said beginning element;
   energy responsive means arranged for reception of radiant energy from said display;
   energy transmitting means disposed intermediate said display means and said energy responsive means;
   a variable opacity pattern carried by said energy transmitting means, said pattern having a plurality of elements depicting said characteristics of said message and serially arranged in orders each equivalent to and proportionally smaller than said predetermined order or any one of said plurality of orders and including a total of at least $(2\sqrt{M}-1)^2$ number of elements, said orders each being positioned in said pattern in adjacent redundant relationships whereby to effect convergence of said radiant energy being transmitted through any one of said orders of elements at a specific point at said energy responsive means;

and additional display means for receiving and displaying an output from said energy responsive means.

4. In an apparatus useful in correlating a signal with known characteristics thereof:

signal receiver means for receiving a signal including a message having a plurality of elements serially arranged in a predetermined order having a beginning element and an ending element;

cathode-ray tube display means coupled with said signal receiver means to provide a display depicting individual characteristics of at least said elements of said message as received by said signal receiver means, said elements of said message being arranged in orders ranging from a direct correspondence to said predetermined order to any one of a plurality of orders wherein said elements are separated into two groups and serially arranged to dispose said ending element before and serially adjacent to said beginning element;

visual energy responsive pickup means arranged for reception of radiant energy from said cathode-ray tube display;

energy masking means disposed intermediate said cathode-ray tube display means and said visual energy responsive pickup means;

a variable opacity pattern carried by said energy masking means, said pattern having a plurality of elements depicting said characteristics of said message and serially arranged in orders each equivalent to and proportionally smaller than said predetermined order or any one of said plurality of orders and including a total of at least two times the square root of said plurality of elements less one element with this resultant quantity squared, said orders each being positioned in said pattern in adjacent redundant relationships whereby to effect convergence of said radiant energy being transmitted through any one of said orders of elements at a specific point at said visual energy responsive pickup means;

additional visual display means connected to receive and display an output from said visual energy responsive pickup means;

and timing control means for maintaining synchronous operation of said cathode-ray tube display means, said visual energy responsive pickup means and said additional visual display means.

5. In a correlation system:

transmitting means for emitting a signal, said signal comprising a message having predetermined characteristics;

signal receiver means for receiving said signal including said message and having a plurality of elements serially arranged in a predetermined order of said characteristics and having a beginning element and an ending element;

cathode-ray tube display means coupled with said signal receiver means to provide a display depicting individual characteristics of at least said elements of said message as received by said signal receiver means, said elements of said message being arranged in orders ranging from a direct correspondence to said predetermined order to any one of a plurality of orders wherein said elements are separated into two groups and serially arranged to dispose said ending element before and serially adjacent to said beginning element;

visual energy responsive means arranged for reception of radiant energy from said cathode-ray tube display;

energy masking means disposed intermediate said cathode-ray tube display means and said visual energy responsive pickup means;

a variable opacity pattern carried by said energy masking means, said pattern having a plurality of elements depicting said characteristics of said message and serially arranged in orders each equivalent to and proportionally smaller than said predetermined order or any one of said plurality of orders and including a total of at least two times the square root of said plurality of elements less one element with this resultant quantity squared, said orders each being positioned in said pattern in adjacent redundant relationships whereby to effect convergence of said radiant energy being transmitted through any one of said orders of elements at a specific point at said visual energy responsive pickup means;

additional visual display means connected to receive and display an output from said visual energy responsive pickup means;

and timing control means for maintaining synchronous operation of said transmitting means, said cathode-ray tube display means, said visual energy responsive pickup means and said additional visual display means.

References Cited by the Examiner

UNITED STATES PATENTS

| | | | |
|---|---|---|---|
| 2,451,465 | 10/48 | Barney | 343—100 |
| 2,807,799 | 9/57 | Rosenthal | 343—12 |
| 3,046,545 | 7/62 | Westerfield | 343—5 |
| 3,047,851 | 7/62 | Palmiter | 340—146.3 |
| 3,058,093 | 10/62 | Vernon | 340—146.3 |
| 3,064,519 | 11/62 | Shelton | 340—146.3 |

MALCOLM A. MORRISON, *Primary Examiner.*